United States Patent
Doornbos et al.

(10) Patent No.: US 6,915,716 B2
(45) Date of Patent: Jul. 12, 2005

(54) ROLLER/DAMPER ASSEMBLY

(75) Inventors: David A. Doornbos, Manteno, IL (US); Steven L. Bivens, Kankakee, IL (US)

(73) Assignee: Illinois Tool Works Inc., Glenview, IL (US)

( * ) Notice: Subject to any disclaimer, the term of this patent is extended or adjusted under 35 U.S.C. 154(b) by 190 days.

(21) Appl. No.: 10/353,905

(22) Filed: Jan. 29, 2003

(65) Prior Publication Data

US 2003/0196501 A1 Oct. 23, 2003

Related U.S. Application Data

(60) Provisional application No. 60/374,096, filed on Apr. 19, 2002.

(51) Int. Cl.$^7$ .............................................. F16H 57/00
(52) U.S. Cl. .............................. 74/411; 74/443; 74/461
(58) Field of Search ......................... 74/411, 409, 410, 74/440, 443, 461

(56) References Cited

U.S. PATENT DOCUMENTS

| | | | | |
|---|---|---|---|---|
| 3,661,027 A | * | 5/1972 | Gattesco | 74/411 |
| 5,582,070 A | * | 12/1996 | Dominguez | 74/411 |
| 5,956,998 A | * | 9/1999 | Fenelon | 74/89.17 |
| 6,460,650 B2 | * | 10/2002 | Tsuboi et al. | 180/444 |
| 2004/0060379 A1 | * | 4/2004 | Bernhard et al. | 74/388 PS |

* cited by examiner

Primary Examiner—David M. Fenstermacher
(74) Attorney, Agent, or Firm—Mark W. Croll; Paul F. Donovan

(57) ABSTRACT

A roller/damper is configured for use with an associated sliding object such as a drawer that is movable between a first position and a second position along a rail having a rack gear disposed thereon. The roller/damper includes a roller having an outside diameter that is configured for movement along the rail. A gear housing is disposed adjacent the roller and has gear teeth formed thereon for engaging the rail rack gear. A damper rotor is positioned in the gear housing. The roller, gear housing and rotor rotate about a common axis. A damping material is disposed about the damper rotor within the gear housing for damping rotation of the gear housing relative to the rotor. A shaft extends through the roller, the gear housing and the rotor. The rotor is fixed to the shaft and the roller and gear housing are rotational about the shaft independent of one another. The roller rotates as it moves along the associated rail, and when the gear housing, moving along the rail with the roller, engages the rack gear, movement of the roller/damper is dampened by the engagement of the gear housing with the rack gear.

17 Claims, 2 Drawing Sheets

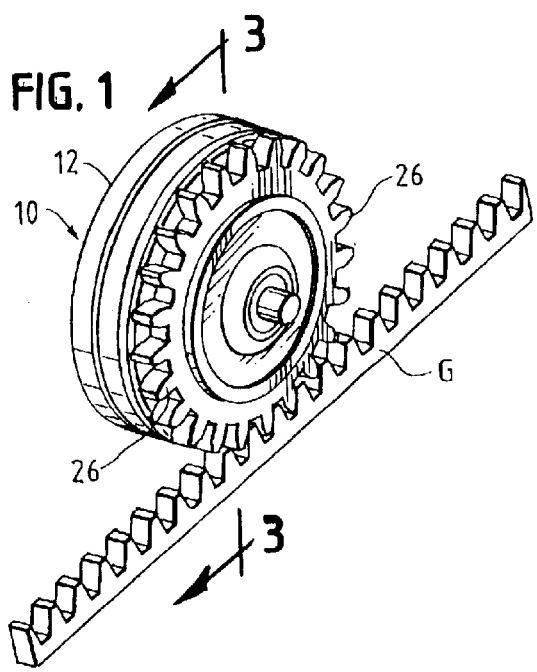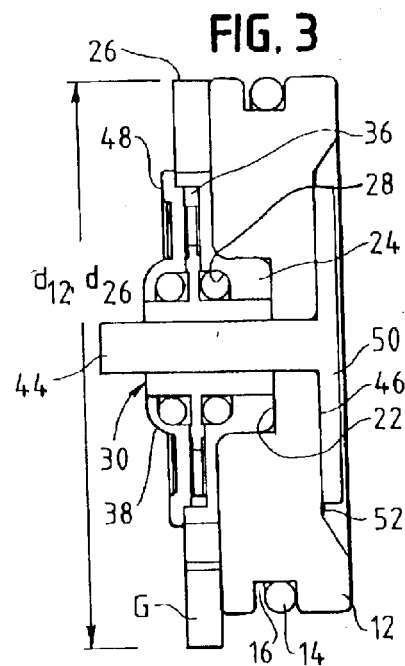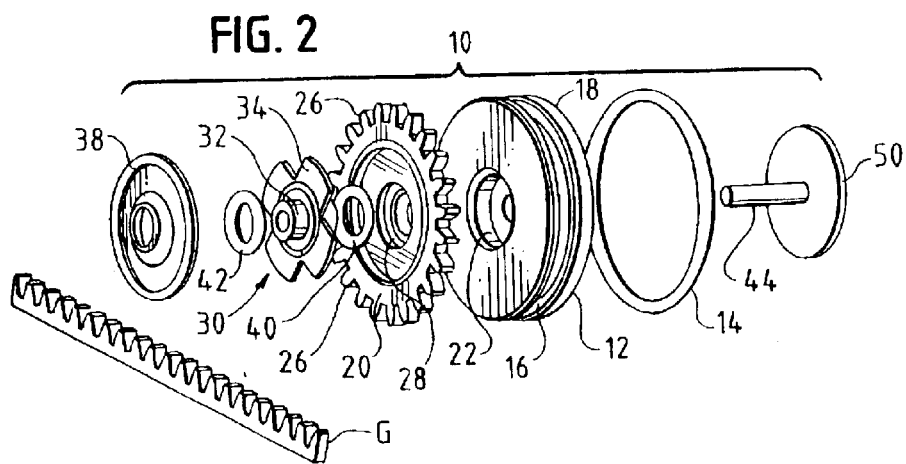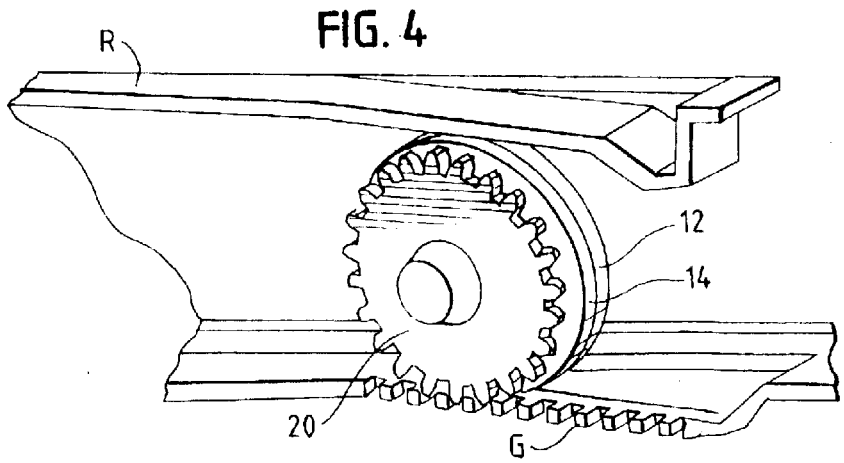

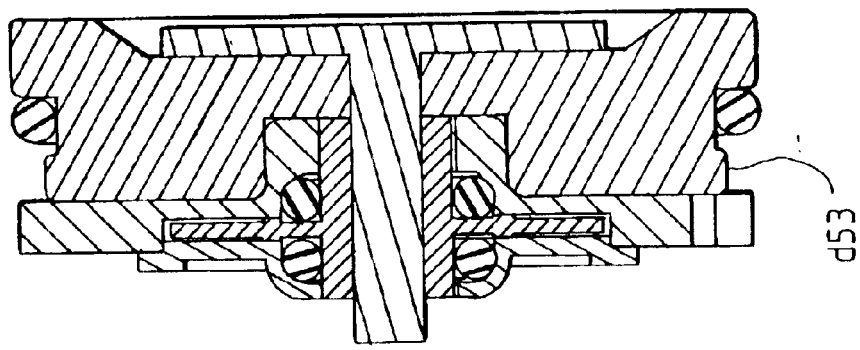
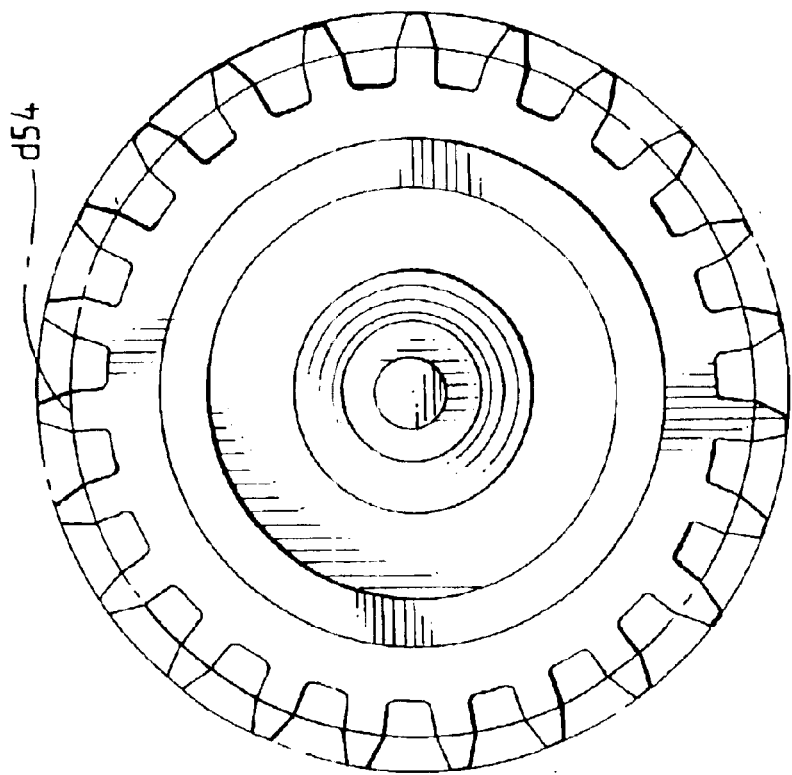

ROLLER/DAMPER ASSEMBLY

CROSS-REFERENCE TO RELATED APPLICATION DATA

The present application claims priority of U.S. Provisional Application Ser. No. 60/374,096, filed Apr. 19, 2002.

BACKGROUND OF THE INVENTION

The present invention relates to damped rollers. More particularly, the present invention relates to rollers that have integral dampers formed as part of the roller assembly.

Rollers are used in a wide variety of applications. For example, rollers may be used in conjunction with slides for drawers, sliding racks, desk drawers, cabinets and the like to slide the object, such as the drawer, from another object, such as the cabinet in which the drawer is installed.

Typically, higher quality sliding arrangements include rollers in conjunction with rails on which the sliding object (e.g., the drawer) slides into and out of, for example, the cabinet. In that the rollers provide a smooth, low-resistance movement of, for example, the drawer, it has been found to often be desirable to dampen or slow the movement of the drawer in one direction. This may be particularly desirable when the drawer is heavily loaded and fast movement, in conjunction with a large mass can result in a high inertia of the moving drawer.

Many such drawers also include spring assists for facilitating movement in one direction. Typically, such spring assists are used to help return a drawer to a closed position, merely by starting movement of the drawer in the closed direction. To this end, it may be desirable to dampen the return movement of the drawer so that the spring return does not return the drawer too quickly to the closed position.

Known damper systems use a separate, mounted assembly to provide a damping function. Typically, a damper includes a unit that is mounted to one side of the drawer, at the rail, to slow the return movement of the drawer. While these dampers work well for their function, they require a separate, mounted element, and cannot be readily retrofitted to the drawer. In addition, these units can be large and may require that the cabinet be designed with additional space between the drawer and the cabinet side to accommodate the damper unit.

Accordingly, there exists a need for a roller/damper assembly that readily fits into a drawer rail and slide unit. Desirably, such a roller/damper assembly provides an arrangement by which a drawer or the like is readily rolled, on rails, for movement. Most desirably, such a unit provides smooth, yet damped movement in one direction and further provides smooth, undamped or free-rolling movement in an opposite direction. Yet more desirably, such a roller/damper assembly can be completely integrated with an existing slide system.

BRIEF SUMMARY OF THE INVENTION

A roller/damper is configured for use with an associated sliding object, such as a drawer, that is movable between a first position and a second position along a rail, the rail having a rack gear disposed thereon.

A present roller/damper readily fits into a drawer rail and slide unit. Such a roller/damper assembly provides an arrangement by which the exemplary drawer is readily moved along the rails. The present roller/damper provides smooth, yet damped movement in one direction (such as the closing direction) and may provide smooth, undamped or free-rolling movement in the opposite direction (such as the opening direction).

The roller damper includes a roller having an outside diameter and configured for movement along the rail. In a current embodiment, the roller has a channel formed about an outer surface and includes a friction-enhancing material disposed within the channel. The friction-enhancing material can be formed as an O-ring.

A gear housing is disposed adjacent the roller. The gear housing has gear teeth formed thereon for engaging the rail rack gear. The teeth are formed at an outer periphery thereof. In a present embodiment, the roller and gear housing have about equal outside diameters.

A damper rotor is positioned in the gear housing. The roller, gear housing and rotor all have a common axis. A damping material is disposed within the gear housing and the rotor is positioned within the damping material for damping rotation of the gear housing relative to the rotor.

A shaft extends through the roller, the gear housing and the rotor, along the common axis. The rotor is fixed to the shaft whereas the roller and gear housing are rotational about the shaft. Rotation of the roller and the gear housing about the shaft are independent of one another.

The roller rotates as it moves along the rail. When the gear housing, moving along the rail with the roller, engages the rack gear, movement of the roller/damper is dampened by the engagement of the gear housing teeth with the rack gear.

A cap is positioned on the gear housing opposite the roller. To seal the damper, seals are positioned between the gear housing and the rotor and between the rotor and the cap.

In a current embodiment, the roller has a counter-bored central region and the gear housing has a projected region for nesting in the counter-bored central region of the roller. Likewise, the gear housing can have a counter-bored central region for receiving the rotor when it is disposed in the gear housing.

These and other features and advantages of the present invention will be apparent from the following detailed description and figures, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein:

FIG. 1 is a perspective view of an assembled roller/damper assembly in accordance with the principles of the present invention;

FIG. 2 is an exploded view of the roller/damper assembly of FIG. 1;

FIG. 3 is a cross-sectional view of the roller damper assembly taken along line 3—3 of FIG. 1; and FIG. 4 is a perspective view of the roller/damper mounted to an associated drawer rail.

FIG. 5 illustrates the diameter of the roller and the gear pitch diameter.

DETAILED DESCRIPTION OF THE INVENTION

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

Referring now to the figures and in particular, to FIG. 1, there is shown a roller/damper assembly 10 embodying the principles of the present invention. The roller/damper assembly 10 provides an arrangement by which a drawer or the like is readily rolled, on rails R, for movement. Such a unit can provide smooth, yet damped movement in one direction and smooth, undamped or free-rolling movement in an opposite direction, or such a unit can provide smooth, yet damped movement in both directions in the notched or rack area.

The roller/damper assembly 10 is used in conjunction with a rack gear G and rail set R (FIG. 4), for a sliding object, such as a drawer. The roller/damper assembly 10 includes a roller 12 that is frictionally engaged with a rail R on the drawer. In a present embodiment, the roller 12 includes friction-enhancing material, such as the exemplary O-ring 14 positioned within a channel 16 on an outer surface 18 of the roller 12. The O-ring 14 provides frictional engagement of the roller 12 with the rail R.

A gear housing 20 is positioned adjacent the roller 12. The roller 12 can include a counter bore 22 into which a central portion 24 of the housing 20 fits. The gear housing 20 has gear teeth 26 formed in an outer periphery thereof having an outside diameter d26 that is about equal to or slightly smaller than an outside diameter d12 of the roller 12. With reference to FIG. 5, it is noted that the diameter d53 of the roller is about the same as the gear pitch diameter d54. Similar to the roller 12, the gear housing 20 has a counter bore 28 therein so that the gear housing 20 nests in the roller 12. Nesting of the gear housing 20 and roller 12 permits fitting these parts together in reduced transverse space (e.g., width); however, the gear housing 20 and roller 12 rotate freely, i.e., independently of one another. The gear housing counter bore 28 defines a well-like region in the housing 20.

A rotor 30 is positioned in the gear housing well 28. The rotor 30, as will be appreciated by those skilled in the art, includes a central hub 32 and arms 34 that extend outwardly from the hub 32. The rotor 30 is positioned in the well 28 and a damping media or material, indicated at 36, is positioned within the well 28 so that rotation of the rotor 30 is resisted by the presence of the damping material 36. A cap 38 is fitted over the rotor 30 to seal the rotor 30 within the gear housing 20. To prevent leakage of the damping material 36 and to prevent contamination of the damping material 36, seals 40, 42 are positioned between the rotor 30 and gear housing 20 at the well region 28 and at the rotor 30 interface with the cap 38. In this manner, the damper is a self contained, sealed unit. Preferably, the cap is ultrasonically welded to the housing, but can be attached in other suitable ways.

Referring to FIG. 3, a post or pin 44 extends fully through the roller/damper assembly 10, from an outside face 46 of the roller 12 to an outside face 48 of the cap 38. The pin 44 can include a flange 50, to secure the pin 44 against the face 46 of the roller 12. The roller 12 can include a second counter bore indicated at 52 into which the pin flange 50 fits so that it is flush with or within the profile of the roller 12.

The pin 44 fits loosely through the roller 12 (that is, the roller 12 rotates freely about the pin 44) and is fixed to the rotor 30 at the roller hub 32. In this manner, when the position of the pin 44 is fixed (i.e., not permitted to rotate), the roller 12 rotates freely about the pin 44 (and independently of the gear housing 20), and rotation of the gear housing 20 is damped by the rotor 30 being stationary relative to the damping media 36). As will be appreciated by those skilled in the art from a study of the drawings and the present disclosure, as the roller 12 rotates (without the gear housing 20 engaging the rack gear G), there is no resistance offered by the damping material 36. When, however, the gear housing 20 engages a toothed or like surface (such as the above-noted rack gear G), with the pin 44 fixedly mounted to the rotor 30, damping is effected to dampen rotation of the gear housing 20 and thus dampen or slow linear movement of the roller/damper 10 along the rail R.

Referring to FIG. 4. in a typical use in which a drawer is mounted by a fixed rail R and a sliding rail (not shown), the roller/damper assembly 10 is mounted to a drawer slide (not shown). As the drawer is opened, the slide moves along the fixed rail R onto the moving rail. The roller/damper 10 is mounted, by the pin 44, to the slide on the moving rail. As the drawer is pushed in toward the cabinet, the slide, likewise moves toward the cabinet, approaching the fixed rail R. At this point, the gear housing 20 is not engaged with the rack gear G, and as such, there is no damping. Approaching the cabinet, the rack gear G is positioned at about the fixed rail R. The roller/damper assembly 10 approaches the cabinet and the gear housing teeth 26 engage the rack gear G at the fixed rail R. Engagement of the gear housing teeth 26 with the rack gear G requires that the gear housing 20 rotate (relative to the fixed rotor 30) which actuates or engages the damper, and thus return of the drawer is dampened.

As will also be appreciated by those skilled in the art, the pin 44 can be configured so that it "catches" the drawer as the drawer is closing and disengages from the drawer as it is opening. In this manner, it is the movement at the end of the closing "cycle" of the drawer that can be dampened and the full opening "cycle" can be carried out with the roller/damper 10 disengaged so that no damping occurs.

As will be appreciated from a study of the drawings and the above description, the present roller/damper assembly 10 provides a roller 12 having a selectively actuated damping function in a compact, integral unit for use in, for example a drawer, so that damping is effectuated when the drawer or the like is moved in one direction, such as pushed closed, but is non-operational when the drawer is moved toward the other direction, such as toward an open position.

Although damping has been achieved with other devices, typically additional gears are required with multiple assemblies. The present roller/damper 10, on the other hand, provides an integral, compact and efficient unit in which a number of advantageous and desirable characteristics are afforded all in a relatively cost effective design. Moreover, because of the integral design, such a roller/damper 10 substantially simplifies the structure required for damping and can be fitted into existing rail-type structures.

All patents referred to herein, are hereby incorporated herein by reference, whether or not specifically do so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A roller/damper for use with an associated sliding object that is movable between a first position and a second position, comprising:
   a roller having an outside diameter and configured for movement, the roller rotating about an axis;
   a gear housing disposed adjacent the roller and rotating about an axis common with the roller axis, the gear housing having gear teeth formed thereon for engaging a rack gear of the associated sliding object;
   a damper rotor positioned in the gear housing and having an axis common with the roller axis and the gear housing axis, the damper rotor being rotatable within the gear housing;
   a damping material disposed about the damper rotor within the gear housing for damping rotation of the gear housing relative to the rotor; and
   a shaft extending along the common axis, through the roller, the gear housing and the rotor, the rotor being fixed to the shaft, the roller and gear housing being rotational about the shaft, rotation of the roller and the gear housing about the shaft being independent of one another,
   wherein the roller rotates as it moves, and when the gear housing, moving along with the roller, engages the rack gear, movement of the roller damper is dampened by the engagement of the gear housing with the rack gear.

2. The roller/damper in accordance with claim 1 wherein the gear housing has an outside diameter at the gear teeth that is about equal to or slightly smaller than the outside diameter of the roller.

3. The roller/damper in accordance with claim 1 including a cap positioned on the gear housing opposite the roller.

4. The roller/damper in accordance with claim 3 including a seal positioned between the gear housing and the rotor and a seal positioned between the rotor and the cap for sealing the rotor and damping material within the gear housing.

5. The roller/damper in accordance with claim 1 wherein the roller has a channel formed about an outer surface thereof and including a friction-enhancing material disposed within the channel.

6. The roller/damper in accordance with claim 5 wherein the friction-enhancing material is formed as an O-ring.

7. The roller/damper in accordance with claim 1 wherein the shaft has a flange at an end thereof.

8. The roller/damper in accordance with claim 7 wherein the flange abuts the roller.

9. The roller/damper in accordance with claim 1 wherein the roller has a counter-bored central region and wherein the gear housing has a projected region for nesting in the counter-bored central region of the roller.

10. The roller/damper in accordance with claim 9 wherein the gear housing has a counter-bored central region and wherein the rotor is disposed within the counter-bored central region of the gear housing.

11. The roller/damper in accordance with claim 1 wherein the sliding object is movable between the first position and the second position along an associated rail, the associated rail includes the rack gear, and the roller is configured for movement along the rail.

12. A roller/damper for use with an associated sliding object that is movable between a first position and a second position along an associated rail, the associated rail having a rack gear disposed thereon, comprising:
    a roller having an outside surface having a friction-enhancing material thereon, the roller having a diameter and configured for movement along the rail;
    a gear housing disposed adjacent the roller, the gear housing having gear teeth formed thereon for engaging the rack gear of the associated rail, the gear housing having an outside diameter that is less than the roller;
    a damper rotor within the gear housing, the damper rotor being rotatable within the gear housing and having a damping material disposed about the damper rotor within the gear housing for damping rotation of the gear housing relative to the rotor;
    a cap positioned on the gear housing to enclose the rotor and damping material; and
    a shaft extending through the roller, the gear housing and the rotor, the rotor being fixed to the shaft, the roller and gear housing being rotational about the shaft, rotation of the roller and the gear housing about the shaft being independent of one another,
    wherein movement of the roller along the associated rail is dampened when the gear housing teeth engage the rack gear.

13. The roller/damper in accordance with claim 12 including seal positioned between the gear housing and the rotor and between the rotor and the cap for sealing the rotor and damping material within the gear housing.

14. The roller/damper in accordance with claim 12 wherein the friction-enhancing material is formed as an O-ring set within a recess in an outer surface of the roller.

15. The roller/damper in accordance with claim 12 wherein the shaft has a flange at an end thereof configured to abut the roller.

16. The roller/damper in accordance with claim 12 wherein the roller has a counter-bored central region and wherein the gear housing has a projected region for nesting in the counter-bored central region of the roller, and wherein the gear housing has a counter-bored central region opposite the projected region and wherein the rotor is disposed within the counter-bored central region of the gear housing.

17. The roller/damper in accordance with claim 12 wherein the gear housing includes a pitch diameter about equal to the roller.

* * * * *